United States Patent Office

2,703,778
Patented Mar. 8, 1955

2,703,778

THERAPEUTIC EMULSIN COMPLEX

Ernst T. Krebs and Ernst T. Krebs, Jr.,
San Francisco, Calif.

No Drawing. Application July 10, 1952,
Serial No. 298,212

3 Claims. (Cl. 167—73)

This invention relates to a therapeutic agent for preventing or alleviating fermentation in the intestinal tract.

It is an object of the invention to provide a therapeutic agent which, when administered orally, is capable of passing through the stomach without being destroyed, and is effective in the intestine to correct certain pathological conditions such as fermentation.

It is a further object of the invention to provide a therapeutic agent which is effective in the correction of fermentation in the intestinal tract and which is also non-toxic in doses considerably in excess of the maximum therapeutic dose.

These and other objects of the invention will be apparent from the ensuing description and the appended claims.

This application is a continuation-in-part of our copending application Serial No. 16,401, filed March 22, 1948, entitled "Emulsin Complex," now abandoned. The said application Serial No. 16,401 is in turn a continuation-in-part of our application Serial No. 511,186, filed November 20, 1943, now Patent No. 2,464,240.

In our application Serial No. 511,186 above referred to, there is described and claimed a novel therapeutic agent and a method of producing the same which is effective for the treatment of various allergies. The method therein described comprises extracting seeds of the prunus family which are ground to a pulp, to remove oils therefrom; treating the undissolved portion with water to produce an aqueous extract; precipitating an emulsin complex from the aqueous extract by treatment with a suitable precipitant, such as acetone; filtering off the emulsin complex; and, finally, precipitating the filtrate with a suitable agent such as ammonium alum.

We have now found that this emulsin complex that remains upon the filter and is produced in the first precipitation of the aqueous extract, is itself a highly effective therapeutic agent for treatment of certain pathological conditions in the intestine, principally fermentation.

The therapeutic agent of this invention may be prepared by the method described in detail hereinbelow from any of the seeds of the prunus family, such as, for example, the ground kernels of apricot, almond, peach and other seeds of the prunus family. This emulsin complex is not only highly effective for the purpose hereinabove set forth, but it is also non-toxic when administered orally much in excess of the maximum therapeutic dose. The emulsin complex may be used as such. Preferably, however, it is used in admixture with a suitable inert filler material, advantageously magnesium oxide. By "filler" is meant a material, which usually is neutral therapeutically (i. e., has no therapeutic activity per se) which is non-toxic to human beings when administered orally, and which serves to extend, dilute or bulk the active ingredient, i. e., the emulsin complex. Any other suitable filler material may be used in place of magnesium oxide, provided the same does not deleteriously affect the therapeutic activity of the emulsin complex, as by holding it by strong adsorptive forces or reacting chemically therewith, and provided that the filler does not itself have a toxic effect.

Examples of other fillers are sodium bicarbonate, magnesium silicate, lactose and arrowroot starch. The proportion of active ingredient (emulsin complex) to filler may be about 150 to 200 parts by weight of active ingredient to 100 parts by weight of filler.

In the preferred embodiment of the invention, the emulsin complex is mixed with magnesium oxide or other suitable filler in the proportion of about two parts by weight of emulsin complex to one part by weight of filler. This mixture, in capsule form or compressed and molded into a pill, is administered orally. The recommended dosage is one to two grains of the emulsin complex, that is to say, about one and a half (1½) to three grains of the mixture of two parts emulsin and one part inert filler.

The preferred method of producing the emulsin complex is as follows: Unblanched kernels of seeds of the prunus family, such as apricot kernels, are ground to a fine pulp. The oils and fats are extracted by means of any of the well known fat solvents, provided the solvent does not inactivate the chemical principle which it is desired to recover and provided it can be easily and simply removed from the seed pulp, so that the aqueous extract containing the desired principle may be substantially fat-free and oil-free. Ketones, ethers, alcohols and alkyl acetates may be used. Acetone and ether (i. e., ethyl ether) are the preferred solvents, and they are preferably both used in sequence. In the preferred method acetone is used as a preliminary fat solvent, since it also serves to dehydrate the seed pulp, followed by the use of ether. Typically, for every 500 grams of apricot seed pulp taken on a dry basis, 6000 cc. of acetone should be added, followed by 2000 cc. of ether. The fat-removing solvents are percolated through the pulp until the fats and oils are substantially completely removed. The use of ether as a fat solvent is highly advantageous, because it is very volatile and is capable of easy removal from the seed pulp.

After the seed pulp has been treated to remove the oils and fats, whatever volatile solvent remains in the seed pulp may be removed in a suitable manner, as, for example, by spreading the pulp on paper, for example, white blotting paper. When the pulp is thoroughly dry, which is important to insure complete removal of all the ether or other volatile solvent, it is again placed in the percolator and about 3000 cc. of distilled water is poured on the pulp for every 500 grams of ground kernel seeds used. The seed pulp is macerated for a suitable length of time until substantially all of the emulsin complex therein has been dissolved by the water, said maceration usually requiring from four to five hours. However, the maceration will depend upon a number of factors, such as the quality of the seed pulp treated. After the maceration is substantially complete, the stop-cock of the percolator is opened and percolation is allowed to proceed. If 1000 cc. is not obtained by percolation, enough distilled water should be percolated through the pulp to measure 1000 cc. This percolation is carried out at room temperature, that is, between about 50° and 100° F.

The aqueous extract thus obtained contains the desired emulsin, prunase, oxynitrolase and amygdalase, and other enzymes, such as celliobase, gentianase, lacticdehydrogenase, besides gum, sugar, protein and mineral salts, and it is desirable that this emulsin complex be substantially completely precipitated. With the emulsin complex there is also precipitated some gum, protein, and a small amount of sugar and mineral salts. This precipitation may be accomplished by adding any agent which will precipitate the emulsin complex, subject to the limitation that the precipitating agent should not inactivate the final product. In practice, it has been found satisfactory to add to the percolate obtained as above set forth, an equal volume of acetone and agitate vigorously to insure the substantially complete precipitation of the emulsin complex present in the percolate. Thereafter, the resulting mass is filtered to separate the precipitated emulsin complex. When filtration has been completed, the emulsin complex on the filter paper is thoroughly dried at room temperature. When dry, this precipitate is placed in a porcelain mortar and reduced to a fine powder. In place of acetone as a precipitating agent for the emulsin complex, any of the lower alcohols may be used, such as ethyl alcohol, propyl alcohol, butyl alcohol, iso-propyl-alcohol, iso-butyl alcohol, and the like. Acids, in general, may also be employed. However, acetone is preferred.

We claim:
1. A composition of matter having therapeutic value for treatment of intestinal fermentation, comprising an admixture of an inert filler material and an emulsin complex derived from seeds of the prunus family, said filler material being present in sufficient amount to prevent cohesion of the emulsin complex into a gummy mass and to allow free dispersion thereof in the intestinal tract, said filler material also being chemically inert toward the emulsin complex and having no substantial adsorptive force therefor, said emulsin complex being derived from seeds of the prunus family by a process including the following steps: extracting oils from the macerated seeds, extracting the de-oiled residue with water and precipitating from the resulting aqueous extract an alcohol-and acetone-insoluble fraction with a solvent selected from the class consisting of acetone and lower aliphatic alcohols.

2. A composition of matter having therapeutic value for treatment of intestinal fermentation, comprising an admixture of magnesium oxide and an emulsin complex derived from seeds of the prunus family by a process including the following steps: extracting oils from the macerated seeds, extracting the de-oiled residue with water and precipitating from the resulting aqueous extract an alcohol-and acetone-insoluble fraction with a solvent selected from the class consisting of acetone and lower aliphatic alcohols.

3. A composition of matter having therapeutic value for treatment of intestinal fermentation, comprising an admixture of an emulsin complex and a filler material; said filler material being selected from the group consisting of magnesium oxide, sodium bicarbonate, magnesium silicate; said filler material being present in quantity sufficient to prevent cohesion of the emulsin complex to a gummy mass and to allow free dispersion thereof in the intestinal tract; said emulsin complex being derived from seeds of the prunus family by a process including the following steps: extracting oils from the macerated seeds, extracting the de-oiled residue with water and precipitating from the resulting aqueous extract an alcohol-and acetone-insoluble fraction with a solvent selected from the class consisting of acetone and lower aliphatic alcohols.

References Cited in the file of this patent

UNITED STATES PATENTS

| | | |
|---|---|---|
| 1,486,002 | Alsleben | Mar. 4, 1924 |
| 2,464,240 | Krebs | Mar. 15, 1949 |

FOREIGN PATENTS

| | | |
|---|---|---|
| 358,984 | Canada | July 7, 1936 |
| 417,513 | Great Britain | Oct. 1, 1934 |

OTHER REFERENCES

U. S. Dispensatory, 24th ed. (1947), pp. 654, 655.
Waksman and Davison, Enzymes (publ. 1926), pp. 186, 187, 271, 272.
U. S. Dispensatory, 21st ed. (1926), pp. 127, 128.